(12) United States Patent
Miu et al.

(10) Patent No.: US 9,353,566 B2
(45) Date of Patent: May 31, 2016

(54) POWER DOOR ACTUATION SYSTEM

(71) Applicant: MAGNA CLOSURES INC., Newmarket (CA)

(72) Inventors: Traian Miu, Oakville (CA); J. R. Scott Mitchell, Newmarket (CA); Gabriele Wayne Sabatini, Keswick (CA)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 14/472,854

(22) Filed: Aug. 29, 2014

(65) Prior Publication Data

US 2015/0059250 A1    Mar. 5, 2015

Related U.S. Application Data

(60) Provisional application No. 61/871,937, filed on Aug. 30, 2013.

(51) Int. Cl.

| | |
|---|---|
| *E05F 15/614* | (2015.01) |
| *E05F 15/611* | (2015.01) |
| *E05F 15/655* | (2015.01) |
| *B60J 5/04* | (2006.01) |
| *E05F 15/73* | (2015.01) |

(52) U.S. Cl.
CPC ............ *E05F 15/614* (2015.01); *B60J 5/0413* (2013.01); *B60J 5/0472* (2013.01); *E05F 15/611* (2015.01); *E05F 15/655* (2015.01); *E05F 15/73* (2015.01); *E05Y 2400/36* (2013.01); *E05Y 2900/531* (2013.01)

(58) Field of Classification Search
CPC ......... E05F 15/10; E05F 15/12; E05F 15/121; E05F 15/18; E05F 15/122; E05F 15/603; E05F 15/611; E05F 15/614; E05F 15/655; E05F 15/73; B60J 5/0413; B60J 5/04; B60J 5/0472
USPC .................... 49/349, 358, 333, 334, 340, 339
See application file for complete search history.

(56) References Cited

U.S. PATENT DOCUMENTS

| | | | | |
|---|---|---|---|---|
| 3,002,581 | A | * | 10/1961 | Deibel et al. .................. 180/289 |
| 3,141,662 | A | * | 7/1964 | Wise ................................ 49/280 |
| 3,398,484 | A | * | 8/1968 | Katsumura et al. ............. 49/138 |
| 4,121,382 | A | * | 10/1978 | Dietrich et al. ................. 49/334 |

(Continued)

FOREIGN PATENT DOCUMENTS

| | | |
|---|---|---|
| CN | 201372664 Y | 12/2009 |
| EP | 105082 B1 | 7/1988 |

(Continued)

*Primary Examiner* — Katherine Mitchell
*Assistant Examiner* — Marcus Menezes
(74) *Attorney, Agent, or Firm* — Dickinson Wright PLLC

(57) ABSTRACT

A power door actuation system for moving a vehicle door relative to a vehicle body between an open position and a closed position includes a motor assembly connectable to one of the vehicle door and the vehicle body that is configured to generate a rotational force. A drive shaft is interconnected to the motor assembly and extends from a first end disposed adjacent the motor assembly to a second end. The second end of the drive shaft is rigidly attached to one of a body strap or a door strap of a hinge for transferring the rotational force from the motor assembly to the respective rigidly attached strap to rotate the respective rigidly attached strap relative to the other of the door strap and the body strap for automatically moving the vehicle door between the open and closed positions.

24 Claims, 4 Drawing Sheets

(56) References Cited

U.S. PATENT DOCUMENTS

| | | | |
|---|---|---|---|
| 4,422,521 A * | 12/1983 | Mochida | 180/271 |
| 4,644,693 A * | 2/1987 | Wang | 49/280 |
| 5,029,364 A * | 7/1991 | Salazar | 16/382 |
| 6,079,767 A | 6/2000 | Faubert et al. | |
| 6,634,140 B1 | 10/2003 | Sellman | |
| 6,891,479 B1 | 5/2005 | Eccleston | |
| 7,500,711 B1 * | 3/2009 | Ewing et al. | 296/146.4 |
| 8,096,606 B2 * | 1/2012 | Hanaki | E05D 15/101 296/146.11 |
| 8,234,817 B2 * | 8/2012 | Neundorf et al. | 49/280 |
| 8,371,638 B2 * | 2/2013 | Heidrich | 296/146.13 |
| 2007/0062119 A1 | 3/2007 | Ritter | |
| 2007/0175099 A1 * | 8/2007 | Kachouh | 49/340 |
| 2008/0210029 A1 | 9/2008 | Wang | |
| 2012/0233925 A1 * | 9/2012 | Linnenkohl | 49/324 |
| 2012/0326466 A1 | 12/2012 | Kileen | |

FOREIGN PATENT DOCUMENTS

| | | | |
|---|---|---|---|
| EP | 1547835 A2 * | 6/2005 | B60J 5/04 |
| FR | 2814771 A1 | 9/2000 | |
| JP | H10266690 A | 10/1998 | |
| WO | 2013001331 A1 | 1/2013 | |

\* cited by examiner

POWER DOOR ACTUATION SYSTEM

CROSS-REFERENCE TO RELATED APPLICATION

This application claims priority to and the benefit of U.S. Provisional Application No. 61/871,937, filed Aug. 30, 2013. The entire disclosure of the above application is incorporated herein by reference.

BACKGROUND

1. Field of the Invention

The present disclosure relates generally to door systems for motor vehicles and, more particularly, to a power door actuation system for moving a swinging vehicle door relative to a vehicle body between an open position and a closed position.

2. Related Art

This section provides background information related to the present disclosure which is not necessarily prior art.

The passenger doors on motor vehicles are typically mounted by upper and lower door hinges to the vehicle body for swinging movement about a generally vertical pivot axis. Each door hinge typically includes a door hinge strap connected to the passenger door, a body hinge strap connected to the vehicle body, and a pivot pin arranged to pivotably connect the door hinge strap to the body hinge strap and define the pivot axis. Such swinging passenger doors ("swing doors") have recognized issues such as, for example, when the vehicle is situated on an inclined surface and the swing door either opens too far or swings shut due to the unbalanced weight of the door. To address this issue, most passenger doors have some type of detent or check mechanism integrated into at least one of the door hinges that functions to inhibit uncontrolled swinging movement of the door by positively locating and holding the door in one or more mid-travel positions in addition to a fully-open position. In some high-end vehicles, the door hinge may include an infinite door check mechanism which allows the door to be opened and held in check at any desired open position. One advantage of passenger doors equipped with door hinges having an infinite door check mechanism is that the door can be located and held in any position to avoid contact with adjacent vehicles or structures.

As a further advancement, power door actuation systems have been developed which function to automatically swing the passenger door about its pivot axis between the open and closed positions. Typically, power door actuation systems include a power-operated device such as, for example, an electric motor and a rotary-to-linear conversion device that are operable for converting the rotary output of the electric motor into translational movement of an extensible member. In most arrangements, the electric motor and the conversion device are mounted to the passenger door and the distal end of the extensible member is fixedly secured to the vehicle body. One example of a power door actuation system is shown in commonly-owned International Publication No. WO2013/013313 to Schuering et al. which discloses use of a rotary-to-linear conversion device having an externally-threaded leadscrew rotatively driven by the electric motor and an internally-threaded drive nut meshingly engaged with the leadscrew and to which the extensible member is attached. Accordingly, control over the speed and direction of rotation of the leadscrew results in control over the speed and direction of translational movement of the drive nut and the extensible member for controlling swinging movement of the passenger door between its open and closed positions.

While such power door actuation systems function satisfactorily for their intended purpose, one recognized drawback relates to their packaging requirements. Specifically, since power door actuation systems rely on linear motion of the extensible member, the electric motor and conversion device must necessarily be packaged in a generally horizontal orientation within the passenger door and with respect to at least one of the door hinges. As such, the application of such conventional power door actuation systems may be limited, particularly to only those vehicular doors where such an orientation would not cause interference with existing hardware and mechanisms such as for example, the glass window function, the power wiring and harnesses, and the like. Put another way, the translational motion of the extensible member requires the availability of a significant amount of internal space within the cavity of the passenger door.

In view of the above, there remains a need to develop alternative power door actuation systems which address and overcome packaging limitation associated with known power door actuation systems as well as to provide increased applicability while reducing cost and complexity.

SUMMARY

This section provides a general summary of the present disclosure and is not a comprehensive disclosure of its full scope or all of its features, aspects and objectives.

It is an aspect of the present disclosure to provide a power door actuation system for swing doors in motor vehicles that can be effectively packaged within the cavity of the door and cooperatively interact with a door hinge.

It is another aspect of the present disclosure to provide a power door actuation system for swing doors in motor vehicles that can be packaged and oriented to have only a small effect on the door's mass moment of inertia relative to a pivot axis of the door hinge.

It is yet another aspect of the present disclosure to provide a power door actuation system equipped with a power-operated actuator mechanism that does not include a rotary-to-linear conversion device and yet which is operable to develop sufficient torque to permit controlled swinging movement of the door and provide a door check functionality.

It is a further aspect for the present disclosure to provide a power door actuation system with a rotary drive mechanism that is adapted to be rotatively driven by the power-operated actuator mechanism and which is configured for attachment to a hinge component of the door hinge connected to the vehicle body.

A still further aspect of the present disclosure is to provide a power door actuation system configured for directly interconnecting a drive member of the rotary drive mechanism to a hinge component of the door hinge associated with the vehicle body.

In addition to these and other aspects and objectives, the power door actuation system of the present disclosure is operable to provide power open and power close functionality (via remote key fob and/or internal and external handle switches); provide infinite door check functionality via software and electronics; provide contact obstacle detection via software and electronics; and provide noncontact obstacle detection via control software and electronics.

Based on these and other aspects and objectives of the present disclosure, a power swing door actuation system is provided for moving a passenger door of a motor vehicle about a pivot axis between open and closed positions relative to a vehicle body. The system includes a power-operated actuator mechanism which is connectable within an internal cavity of the passenger door in close proximity to an upper door hinge, and a rotary drive mechanism rotatively driven by the power-operated actuator mechanism and which is connectable to a hinge component of a lower door hinge. The power-operated actuator mechanism may include an electric motor and geartrain assembly secured to a mounting bracket which is adapted to be mounted within the cavity of the passenger door and in close proximity to the upper door hinge. The rotary drive mechanism may include a first coupler driven by a rotary output component of the electric motor and geartrain assembly, a second coupler rigidly secured to a body hinge component of the lower door hinge, and a drive member having a first end drivingly coupled to the first coupler and a second end drivingly coupled to the second coupler. Accordingly, the power door actuation system of the present disclosure is able to effectuate controlled swinging movement of the passenger door between its open and closed positions by transferring a rotational force directly from the door-mounted, power-operated actuator mechanism to the vehicle-mounted, lower door hinge.

In accordance with one embodiment of the present disclosure, the first coupler is a first female adapter rigidly fixed for rotation with the rotary output component of the electric motor and geartrain assembly. Likewise, the second coupler is a second female adapter rigidly affixed to a body hinge strap component of the lower door hinge. The drive member may include a drive shaft having a first male end portion retained within the first female adapter and a second male end portion retained within the second female adapter. According to an alternative embodiment, the first coupler may include a first male adapter rigidly fixed for rotation with the rotary output component of the electric motor and geartrain assembly while the second coupler may include a second male adapter rigidly fixed to the body hinge strap component of the lower door hinge. With such couplers, the drive member may include a drive shaft having a first female end portion sized to retain the first male adapter and a second female end portion sized to retain the second male adapter. To accommodate angularity during swinging movement of the passenger door relative to the vehicle body, the drive rotary drive mechanism may further include at least one universal joint or U-joint coupled between one of the end portions of the drive shaft and its corresponding adapter. The present disclosure may further include use of a first U-joint between the first end portion of the drive shaft and the first adapter and a second U-joint between the second end of the drive shaft and the second adapter.

The present disclosure may further include a multi-piece drive shaft assembly equipped with a pair of U-joints and which is adapted to be drivingly coupled to the first and second adapters.

In accordance with another embodiment of the present disclosure, the drive member may include a flexible drive component interconnected between the first and second adapters and which is configured to directly transfer torque from the electric motor and geartrain assembly to the body hinge strap component of the lower door hinge that is mounted to the vehicle body.

In accordance with these and other embodiments, the electric motor and geartrain assembly is generally vertically oriented within the door cavity and secured to a hinge mounting bracket that, in turn, is rigidly secured in proximity to the door-mounted hinge component of the upper door hinge. As such, the power door actuation system can be packaged in a forward vacant portion of the door's internal cavity, such as forward of the A-pillar glass run channel, so as to reduce or eliminate impingement of the system components with other functional components of the door assembly.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 2A illustrates a multi-piece drive shaft assembly adapted for use with a rotary drive mechanism of the power door activation system and which includes a pair of U-joints;

DETAILED DESCRIPTION OF EXAMPLE EMBODIMENTS

In general, at least one example embodiment of a power door actuation system constructed in accordance with the teachings of the present disclosure will now be disclosed. The example embodiment is provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, will-known device structures, and well-known technologies are described in detail.

Figure 1:
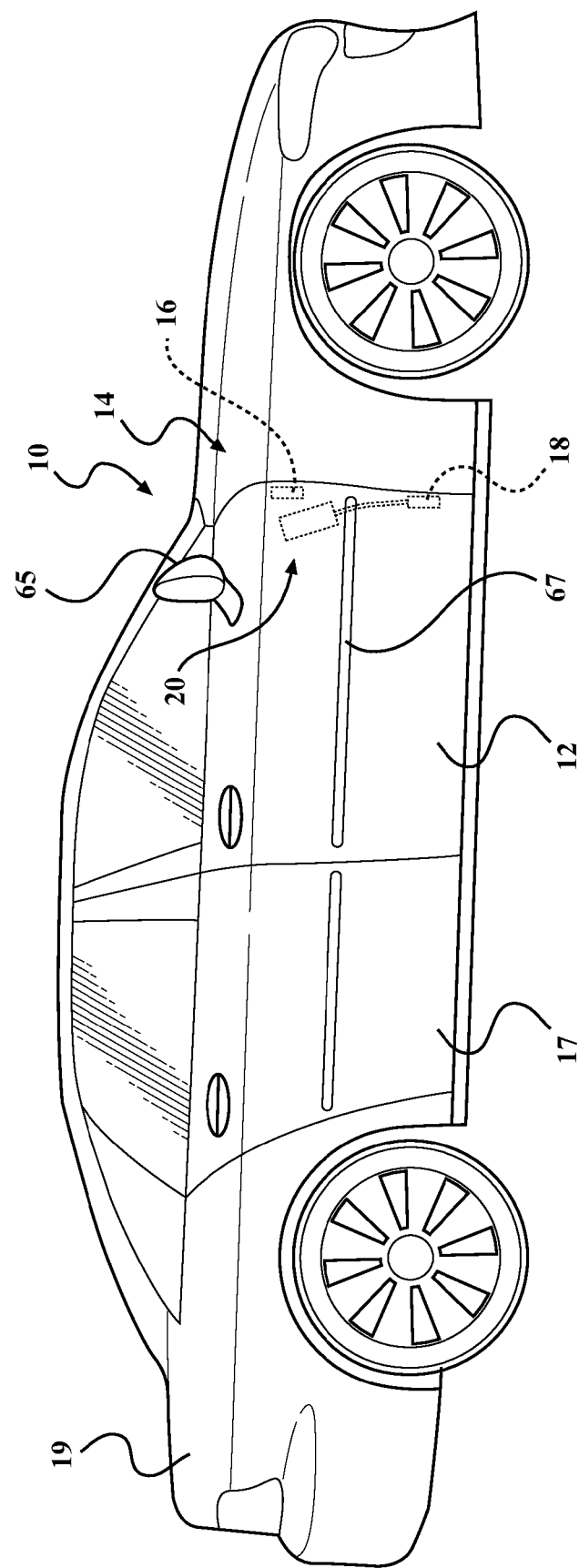
FIG. 1 is a perspective view of an example motor vehicle equipped with a power door actuation system situated between the front passenger swing door and the vehicle body and which is constructed in accordance with the teachings of the present disclosure.

Referring initially to FIG. 1, an example motor vehicle 10 is shown to include a first passenger door 12 pivotally mounted to a vehicle body 14 via an upper door hinge 16 and a lower door hinge 18 which are shown in phantom lines. In accordance with the present disclosure, a power door actuation system 20 is integrated into the pivotal connection between first passenger door 12 and a vehicle body 14. In accordance with a preferred configuration, power door actuation system 20 generally includes a power-operated actuator mechanism secured within an internal cavity of passenger door 12, and a rotary drive mechanism that is driven by the power-operated actuator mechanism and is drivingly coupled to a hinge component associated with lower door hinge 18. Driven rotation of the rotary drive mechanism causes controlled pivotal movement of passenger door 12 relative to vehicle body 14. In accordance with this preferred configuration, the power-operated actuator mechanism is rigidly coupled in close proximity to a door-mounted hinge component of upper door hinge 16 while the rotary drive mechanism is coupled to a vehicle-mounted hinge component of lower door hinge 18. However, those skilled in the art will recognize that alternative packaging configurations for power door actuation system 20 are available to accommodate available packaging space. One such alternative packaging configuration may include mounting the power-operated actuator mechanism to vehicle body 14 and drivingly interconnecting the rotary drive mechanism to a door-mounted hinge component associated with one of upper door hinge 16 and lower door hinge 18.

Each of upper door hinge 16 and lower door hinge 18 include a door-mounting hinge component and a body-mounted hinge component that are pivotably interconnected by a hinge pin or post. The door-mounted hinge component is hereinafter referred to a door hinge strap while the body-mounted hinge component is hereinafter referred to as a body hinge strap. While power door actuation system 20 is only shown in association with front passenger door 12, those skilled in the art will recognize that the power door actuation system can also be associated with any other door or liftgate of vehicle 10 such as rear passenger doors 17 and decklid 19.

Figure 2:
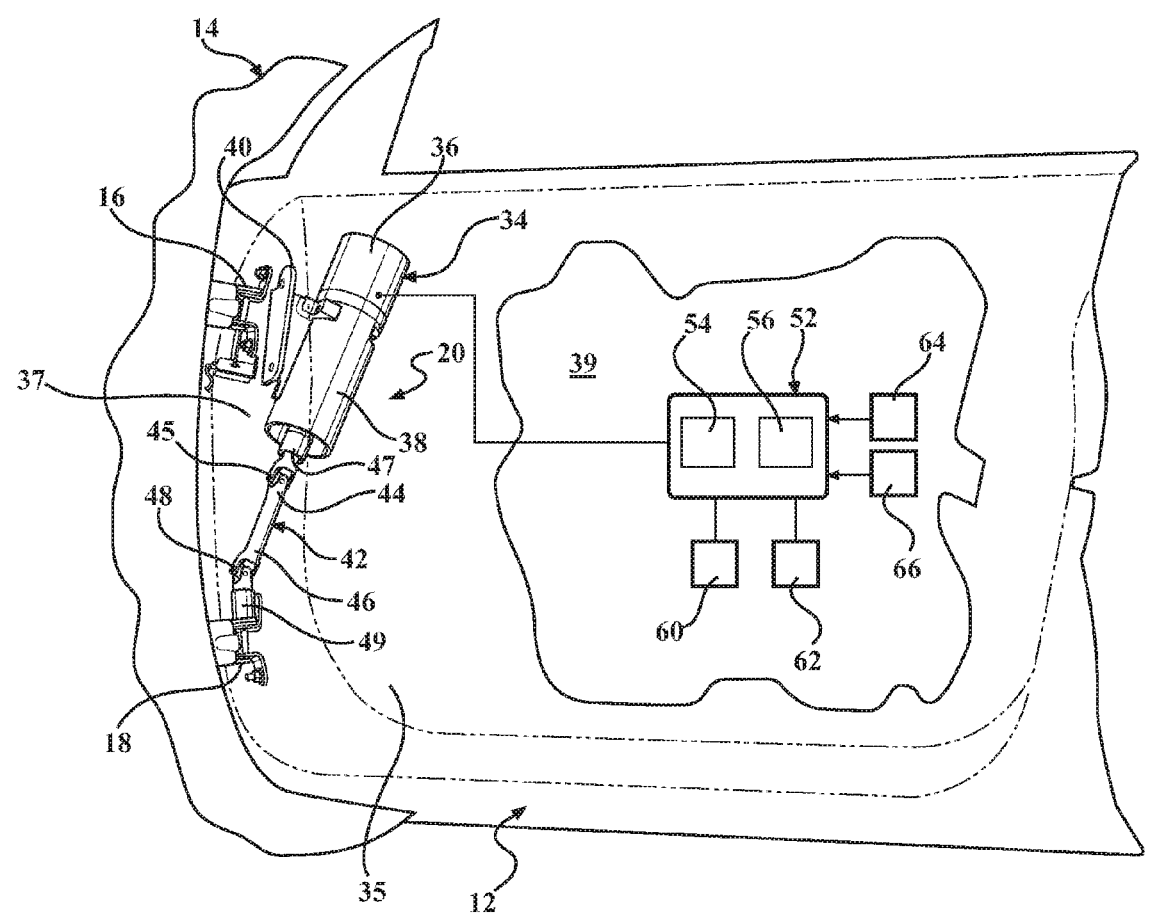
FIG. 2 is a perspective inner side view of the front passenger door shown in FIG. 1, with various components removed for clarity purposes only, in relation to a portion of the vehicle body and which is equipped with the power door actuation system of the present disclosure.
Figure 4:
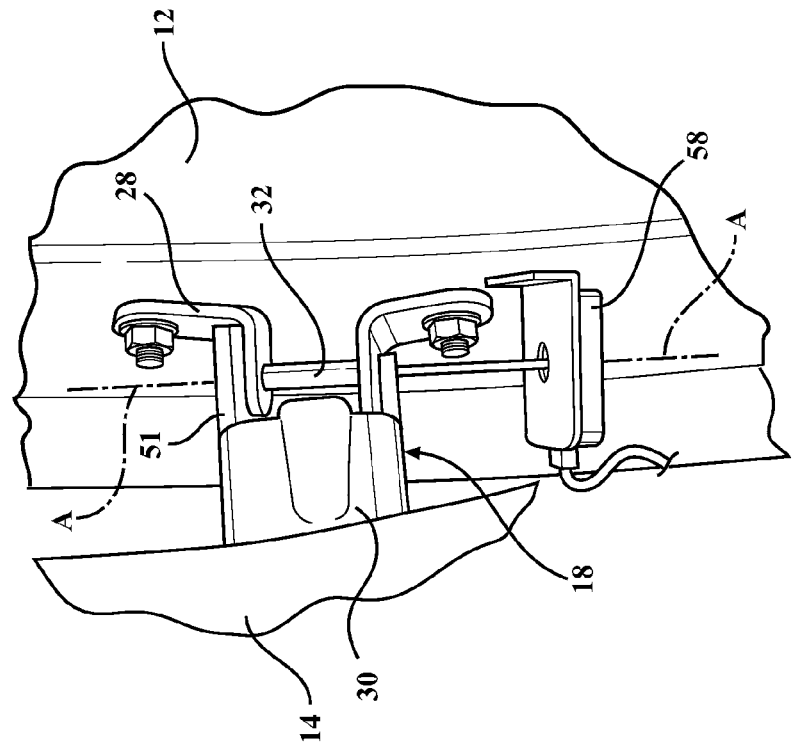
FIG. 4 is a pictorial view of a lower door hinge of the motor vehicle illustrating a drive member associated with the rotary drive mechanism of the power door activation system coupled via a U-joint to a body hinge strap component of the lower door hinge.
Figure 5:
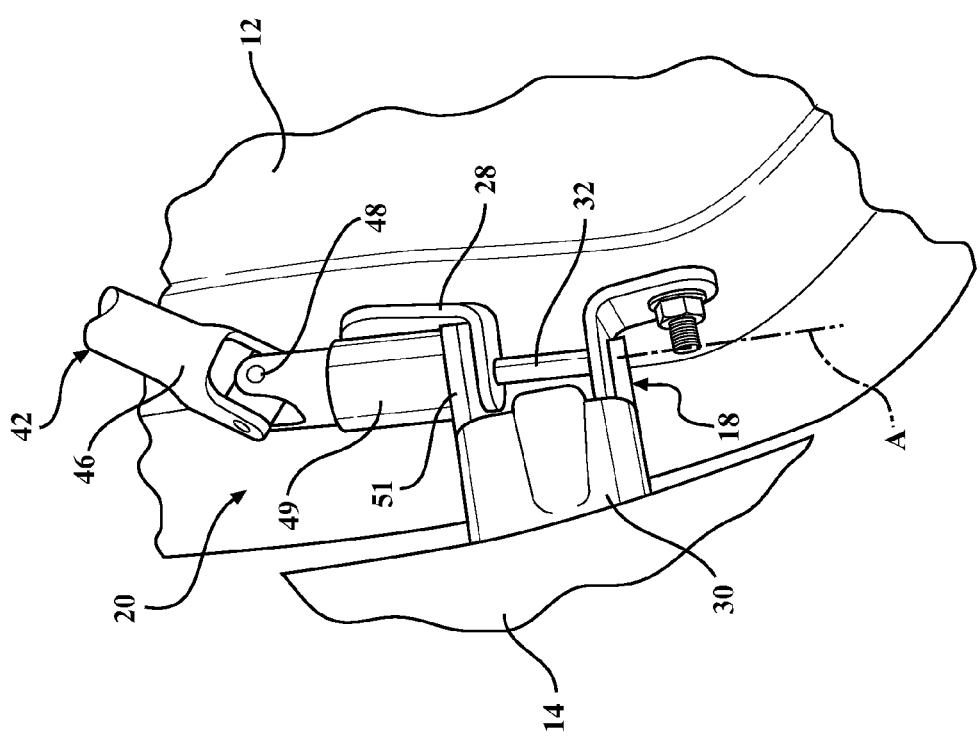
FIG. 5 illustrates a pictorial view of an encoder associated with a control system for the power door actuation system of the present disclosure.

Power door actuation system 20 is generally shown in FIG. 2 and, as mentioned, is operable for controllably pivoting vehicle door 12 relative to vehicle body 14 between an open position and a closed position. As shown in FIGS. 4 and 5, lower hinge 18 of power door actuation system 20 includes a door hinge strap 28 connected to vehicle door 12 and a body hinge strap 30 connected to vehicle body 14. Door hinge strap 28 and body hinge strap 30 of lower door hinge 18 are interconnected along a generally vertically-aligned pivot axis A via a hinge pin 32 to establish the pivotable interconnection between door hinge strap 28 and body hinge strap 30. However, any other mechanism or device can be used to establish the pivotable interconnection between door hinge strap 28 and body hinge strap 30 without departing from the scope of the subject disclosure.

Figure 3:
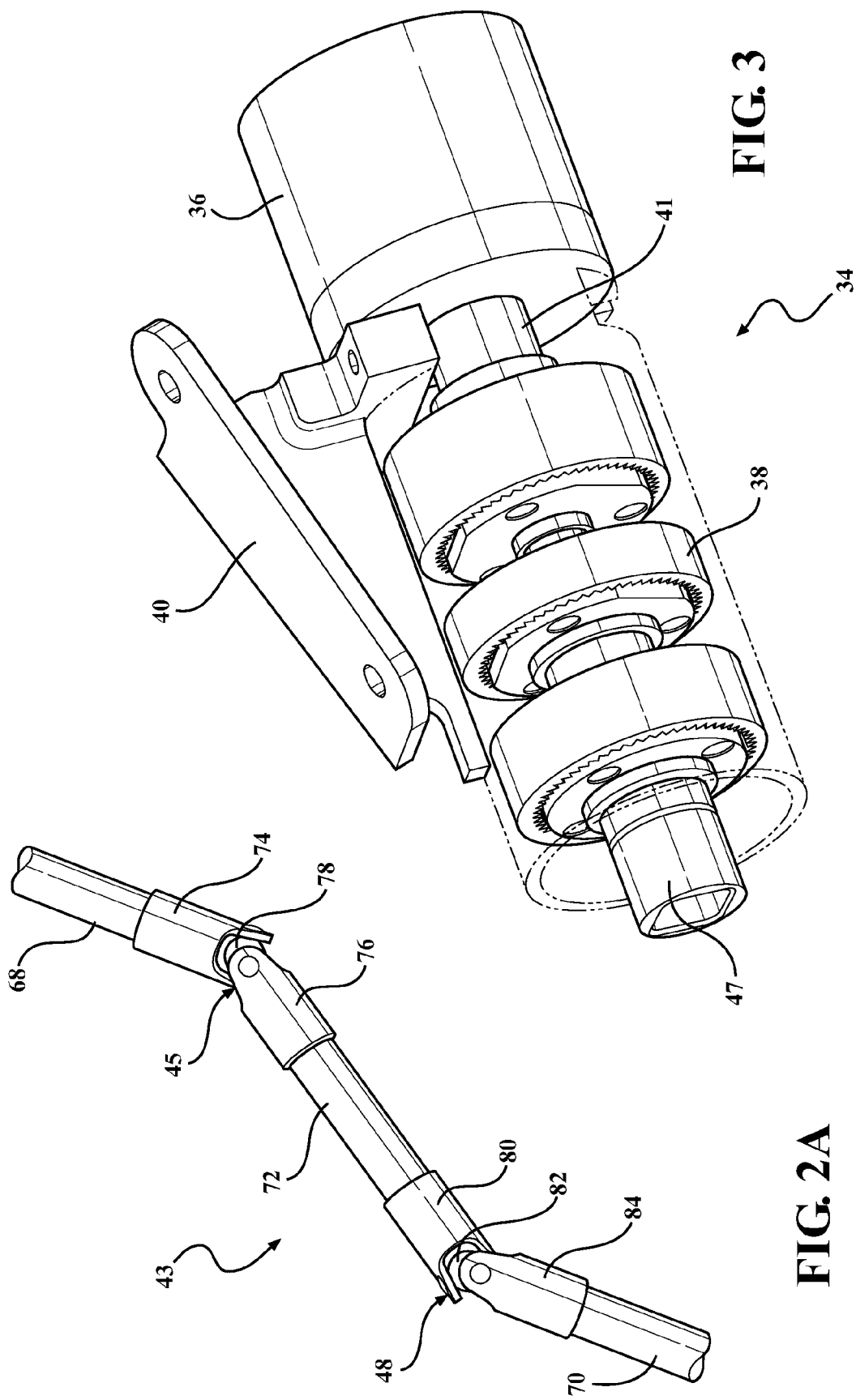
FIG. 3 is a perspective view, partially shown in phantom, of an electric motor and geartrain assembly associated with the power door actuation system of the present disclosure.

As best shown in FIG. 2, power door actuation system 20 includes a power-operated actuator mechanism having a motor and geartrain assembly 34 that is rigidly connectable to vehicle door 12. Motor and geartrain assembly 34 is configured to generate a rotational force. In the preferred embodiment, motor and geartrain assembly 34 includes an electric motor 36 that is operatively coupled to a speed reducing/torque multiplying assembly, such as a high gear ratio planetary gearbox 38. As shown in FIG. 3, high gear ratio planetary gearbox 38 includes three stages, thus allowing motor and geartrain assembly 34 to generate a rotational force having a high torque output by way of a very low rotational speed of electric motor 36. However, any other arrangement of motor and geartrain assembly 34 can be used to establish the required rotational force without departing from the scope of the subject disclosure.

Motor and geartrain assembly 34 includes a mounting bracket 40 for establishing the connectable relationship with vehicle door 12. Mounting bracket 40 is configured to be connectable to vehicle door 12 adjacent to the door-mounted door hinge strap associated with upper door hinge 16. As further shown in FIG. 2, this mounting of motor assembly 34 adjacent to upper door hinge 16 of vehicle door 12 disposes the power-operated actuator mechanism of power door actuation system 20 in close proximity to the pivot axis A. The mounting of motor and geartrain assembly 34 adjacent to upper door hinge 16 of vehicle door 12 minimizes the effect that power door actuation system 20 may have on a mass moment of inertia (i.e., pivot axis A) of vehicle door 12, thus improving or easing movement of vehicle door 12 between its open and closed positions. In addition, as also shown in FIG. 2, the mounting of motor and geartrain assembly 34 adjacent to upper door hinge 16 of vehicle door 12 allows power door actuation system 20 to be packaged in front of an A-pillar glass run channel 35 associated with vehicle door 12 and thus avoids any interference with a glass window function of vehicle door 12. Put another way, power door actuation system 20 can be packaged in a portion 37 of an internal door cavity 39 within vehicle door 12 that is not being used, and therefore reduces or eliminates impingement on existing hardware/mechanisms within vehicle door 12. Although power door actuation system 20 is illustrated as being mounted adjacent to upper door hinge 16 of vehicle door 12, power door actuation system 20 can, as an alternative, also be mounted elsewhere within vehicle door 12 or even on vehicle body 14 without departing from the scope of the subject disclosure.

Power door actuation system 20 further includes a rotary drive mechanism that is rotatively driven by the power-operated actuator mechanism. As shown in FIG. 2, the rotary drive mechanism includes a drive shaft 42 interconnected to an output member of gearbox 38 of motor and geartrain assembly 34 and which extends from a first end 44 disposed adjacent gearbox 38 to a second end 46. The rotary output component of motor and geartrain assembly 34 can include a first adapter 47, such as a square female socket or the like, for drivingly interconnecting first end 44 of drive shaft 42 directly to the rotary output of gearbox 38 In addition, although not expressly shown, a disconnect clutch can be disposed between the rotary output of gearbox 38 and first end 44 of drive shaft 42. In one configuration, the clutch would normally be engaged without power (i.e. power-off engagement) and could be selectively energized (i.e. power-on release) to disengage. Put another way, the optional clutch drivingly would couple drive shaft 42 to motor and geartrain assembly 34 without the application of electrical power while the clutch would require the application of electrical power to uncouple drive shaft 42 from driven connection with gearbox 38. As an alternative, the clutch could be configured in a power-on engagement and power-off release arrangement. The clutch may engage and disengage using any suitable type of clutching mechanism such as, for example, a set of sprags, rollers, a wrap-spring, friction plates, or any other suitable mechanism. The clutch is provided to permit door 12 to be manually moved by the user between its open and closed positions relative to vehicle body 14. An optional location for such a disconnect clutch is shown in FIG. 3 located between the output of electric motor 36 and the input to gearbox 38 and is generally identified by reference numeral 41. The location of this optional clutch is dependent based on, among other things, whether or not gearbox 38 includes "back-driveable" gearing.

Second end 46 of drive shaft 42 is coupled to body hinge strap 30 of lower door hinge 18 for directly transferring the rotational force from motor and geartrain assembly 34 to door 12 via body hinge strap 30. To accommodate angular motion due to swinging movement of door 12 relative to vehicle body 14, the rotary drive mechanism further includes a first universal joint or U-joint 45 disposed between first adapter 47 and first end 44 of drive shaft 42 and a second universal joint or U-joint 48 disposed between a second adapter 49 and second end 46 of drive shaft 42. Alternatively, constant velocity joints could be used in place of the U-joints 45, 48. The second adapter 49 may also be a square female socket or the like configured for rigid attachment to body hinge strap 30 of lower door hinge 18. However, other means of establishing the drive attachment can be used without departing from the scope of the disclosure. Rotation of drive shaft 42 via operation of motor and geartrain assembly 34 functions to actuate lower door hinge 18 by rotating body hinge strap 30 about its pivot axis to which drive shaft 42 is attached and relative to door hinge strap 28. As a result, power door actuation system 20 is able to effectuate movement of vehicle door 12 between its open and closed positions by "directly" transferring a rotational force directly to body hinge strap 30 of lower door hinge 18. With motor and geartrain assembly 34 connected to vehicle door 12 adjacent to upper door hinge 16, second end 46 of drive shaft 42 is attached to body hinge strap 30 of lower door hinge 18. Based on available space within door cavity 39, it may be possible to mount motor and geartrain assembly 34 adjacent to the door-mounted hinge component of lower door hinge 18 and directly connect second end 46 of drive shaft 42 to the vehicle-mounted hinge component of upper door hinge 16. In the alternative, if motor and geartrain assembly 34 is connected to vehicle body 14, second end 46 of drive shaft 42 would be attached to door hinge strap 28.

As best shown in FIG. 4, its an aspect of the disclosure that drive shaft 42 may include second universal joint 48 that is disposed adjacent second end 46 of drive shaft 42. Second adapter 49 is shown to be rigidly attached to a flange 51 formed on body hinge strap 30 and second universal joint 48 includes a stub shaft 53 that is mated with and rigidly interconnected to second adapter 49 for establishing the attachment of drive shaft 42 to body hinge strap 30. Once again, the rigid attachment of second adapter 49 to flange 51 on body hinge strap 30, as well as the rigid attachment of stub shaft 53 of second universal joint 48 to adapter 49 can be established by way of a weld between the respective components. However, other means of establishing the rigid attachment can be used without departing from the scope of the disclosure. It will also be appreciated that the first and second adapters could be configured as male adapters that are received in female connectors associated with the ends of drive shaft 42 and/or U-joints 45, 48.

In another aspect of the disclosure, the drive shaft 42 of the rotary drive mechanism may be a flexible drive shaft for providing flexibility with regard to placement of motor and geartrain assembly 34 anywhere within vehicle door 12 or vehicle body 14. Put another way, flexible drive shaft can be routed through various portions of vehicle door 12 to avoid impingement on existing hardware/mechanisms. As a result, flexible drive shaft allows motor and geartrain assembly 34 to be connectable to other areas within door cavity 39 of vehicle door 12, as well as facilitates the connection of motor and geartrain assembly 34 to other areas of vehicle body 14, such as the vehicle frame, the vehicle wheel well, or the like.

In one exemplary embodiment, the drive shaft 42 of the rotary drive mechanism is the flexible drive shaft having first end 44 drivingly coupled to the output member of the electric motor and geartrain assembly 34, such as the rotary output component of the gearbox 38, and second end 46 drivingly coupled to the body-mounted hinge component, such as the body hinge strap 30 of the lower door hinge 18. In this embodiment, the rotary drive mechanism permits change in relative orientation between the pivot axis A defined by the door hinges 16, 18 and the power-operated actuator mechanism including the electric motor and geartrain assembly 34.

Referring to FIG. 2A, an exemplary multi-piece drive shaft assembly 43 for use with the rotatory drive mechanism is illustrated. The multi-piece drive shaft assembly 43 is configured to be interconnected between the first adapter 47 and the second adapter 49, as an alternative to the drive shaft 42 described above. In general, the multi-piece drive shaft assembly 43 includes a first end shaft 68, a second end shaft 70, an intermediate shaft 72, and first and second U-joints 45, 48. The first end shaft 68 is configured to connect the first adapter 47 to a first yolk 74 of the first U-joint 45. A second yolk 76 of the first U-joint 45 is connected to a first end of the intermediate shaft 72. A first trunnion 78 of the first U-joint 45 facilitates angular movement of the second yolk 76 relative to the first yolk 74 while transferring torque therebetween. As also shown, a second end of the intermediate shaft 72 is connected to a first yolk 80 of the second U-joint 48, which is, in turn, connected via a second trunnion 82 to a second yolk 84 of the second U-joint 48. The second trunnion 82 facilitates angular movement of the second yolk 84 relative to the first yolk 80 of the second U-joint 48 while transferring torque therebetween. The second end shaft 70 is configured to connect the second yolk 84 of the second U-joint 48 to the second adapter 49. The specific length of each shaft 68, 70, 72 associated with the multi-piece draft shaft assembly 43 can be selected to provide optimized torque transfer and permit a modular arrangement for use in different vehicle applications.

As schematically shown in FIG. 2, an electronic control module 52 is in communication with motor and geartrain assembly 34 for providing an electric control signal to electric motor 36 (i.e. in the form of a pulse width modulated voltage) for turning on and turning off electric motor 36 and controlling its direction of output rotation. Electronic control module 52 can include a microprocessor 54 and a memory 56 having executable computer readable instructions stored thereon for carrying out the steps as described herein. Electronic control module 52 can also be configured to receive inputs and transmit outputs as described herein.

Although not expressly illustrated, electric motor 36 can include Hall-effect sensors for monitoring a position and speed of vehicle door 12 during movement between its open and closed positions. For example, one or more Hall-effect sensors may be provided and positioned to send signals to electronic control module 52 that are indicative of rotational movement of electric motor 36 and indicative of the rotational speed of electric motor 36, e.g., based on counting signals from the Hall-effect sensor detecting a target on a motor output shaft. In situations where the sensed motor speed is greater than a threshold speed and where the current sensor registers a significant change in the current draw, electronic control module 52 may determine that the user is manually moving door 12 while motor 36 is also operating to rotate body hinge strap 30, thus moving vehicle door 12 between its open and closed positions. Electronic control module 52 may then send a signal to electric motor 36 to stop motor 36 and may even disengage the clutch (if provided). Conversely, when electronic control module 52 is in a power open or power close mode and the Hall-effect sensors indicate that a speed of electric motor 36 is less than a threshold speed (e.g., zero) and a current spike is registered, electronic control module 52 may determine that an obstacle is in the way of vehicle door 12, in which case the electronic control system may take any suitable action, such as sending a signal to turn off electric motor 36. As such, electronic control module 52 receives feedback from the Hall-effect sensors to ensure that a contact obstacle has not occurred during movement of vehicle door 12 from the closed position to the open position, or vice versa.

As an alternative to the Hall-effect sensors, and as best shown in FIG. 5, an encoder 58 can be disposed adjacent lower door hinge 18 for sensing a relative position of body hinge strap 30 and door hinge strap 28 relative to one another during rotation of door 12 about the pivot axis A. As a result, encoder 58 is able to determine a position of the vehicle door 12 during rotation between the open and closed positions. Although not expressly shown, the encoder 58 can be disposed in communication with the electronic control module 52 and can provide information with regard to the relative position of hinge straps 28, 30 to electronic control module 52. As a result, electronic control module 52 may detect that a user wants to initiate manual movement of vehicle door 12 if signals from encoder 58 indicate relative movement of door strap 28 or body strap 30 at a time when electric motor 36 is not powered.

As schematically shown in FIG. 2, electronic control module 52 can be in communication with a remote key fob 60 or an internal/external handle switch 62 for receiving a request from a user to open or close vehicle door 12. Put another way, electronic control module 52 receives a command signal from either remote key fob 60 and/or internal/external handle switch 62 to initiate an opening or closing of vehicle door 12. Upon receiving a command, electronic control module 52 proceeds to provide a signal to electric motor 36 in the form of a pulse width modulated voltage (for speed control) to turn on motor 36 and initiate pivotal swinging movement of vehicle door 12. While providing the signal, electronic control module 52 also obtains feedback from the Hall-effect sensors of electric motor 36 or encoder 58 to ensure that a contact obstacle has not occurred. If no obstacle is present, motor 36 will continue to generate a rotational force to actuate lower door hinge 18 in accordance with the previous disclosure. Once vehicle door 12 is positioned at the desired location, motor 12 is turned off and the "self-locking" gearing associated with gearbox 38 causes vehicle door 12 to continue to be held at that location. If a user tries to move vehicle door 12 to a different operating position, electric motor 36 will first resist the user's motion (thereby replicating a door check function) and eventually release and allow the door to move to the newly desired location. Again, once vehicle door 12 is stopped, electronic control module 52 will provide the required power to electric motor 36 to hold it in that position. If the user provides a sufficiently large motion input to vehicle door 12 (i.e., as is the case when the user wants to close the door), electronic control module 52 will recognize this motion via the Hall effect pulses and proceed to execute a full closing operation for vehicle door 12.

Electronic control module 52 can also receive an additional input from an ultrasonic sensor 64 positioned on a portion of vehicle door 12, such as on a door mirror 65, or the like. Ultrasonic sensor 64 assesses if an obstacle, such as another car, tree, or post, is near or in close proximity to vehicle door 12. If such an obstacle is present, ultrasonic sensor 64 will send a signal to electronic control module 52, and electronic control module 52 will proceed to turn off electric motor 36 to stop movement of vehicle door 12, and thus prevent vehicle door 12 from hitting the obstacle. This provides a non-contact obstacle avoidance system. In addition, or optionally, a contact obstacle avoidance system can be placed in vehicle 10 which includes a contact sensor 66 mounted to door, such as in association with molding component 67, and operable to send a signal to controller 52.

Those skilled in the art will appreciate that any control strategy associated with known power door actuation systems can be used with power door actuation system 20. For example, the control strategy and modes disclosed in commonly-owned International Publication No. WO 2013/013313 can be readily adapted for use with the present disclosure with such disclosure being incorporated herein by reference.

In view of the above, power door actuation system 20 provides several advantages including optimized packaging, reduced effect on the door's mass moment of inertia, generation of sufficient torque to control pivotal door movement and replicate the door check functionality, and elimination of a rotary-to-linear conversion device.

Obviously, many modifications and variations of the subject disclosure are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A power door actuation system for moving a passenger door of a motor vehicle between open and closed positions relative to a vehicle body, the power door actuation system comprising:
   a power-operated actuator mechanism secured within an internal cavity of the passenger door;
   a rotary drive mechanism driven by said power-operated actuator mechanism and coupled to or in proximity to a first door hinge;
   said power-operated actuator mechanism being coupled to or in proximity to a second door hinge;
   said first door hinge defining a pivot axis about which the passenger door pivotably swings relative to the vehicle body;
   said rotary drive mechanism including a drive member accommodating angular movement of said passenger door relative to said vehicle body;
   said drive member including a drive shaft extending from a first end coupled to said power-operated actuator mechanism to a second end coupled to an adapter attached to said first door hinge; wherein the adapter and said first door hinge are co-axial; and
   said drive shaft transferring rotational force from said power-operated actuator mechanism to said first door hinge.

2. The power door actuation system of claim 1 wherein said power-operated actuator mechanism is secured in proximity to a door-mounted hinge component of said second door hinge.

3. The power door actuation system of claim 2 wherein said power-operated actuator mechanism includes an electric motor and geartrain assembly secured to a mounting bracket, and wherein said mounting bracket is secured adjacent to said door-mounted hinge component of said second door hinge.

4. The power door actuation system of claim 3 wherein said first end of said drive shaft is coupled to an output member of said electric motor and geartrain assembly and said second end of said drive shaft is coupled to a body-mounted hinge component of said first door hinge.

5. The power door actuation system of claim 4 wherein said rotary drive mechanism further includes a first coupler interconnecting said first end of said drive shaft to said output member of said electric motor and geartrain assembly and a second coupler interconnecting said second end of said drive shaft to said body-mounted hinge component of said first door hinge.

6. A power door actuation system for moving a passenger door of a motor vehicle between open and closed positions relative to a vehicle body, the power door actuation system comprising:
- a power-operated actuator mechanism secured within an internal cavity of the passenger door;
- a rotary drive mechanism driven by the power-operated actuator mechanism and coupled to a body-mounted hinge component of a first door hinge;
- wherein said power-operated actuator mechanism is secured in proximity to a door-mounted hinge component of a second door hinge, and wherein said first door hinge defines a pivot axis about which the passenger door pivotably swings relative to the vehicle body;
- said power-operated actuator mechanism includes an electric motor and geartrain assembly secured to a mounting bracket, and wherein said mounting bracket is secured adjacent to said door-mounted hinge component of said second door hinge;
- said rotary drive mechanism includes a drive shaft having a first end coupled to an output member of said electric motor and geartrain assembly and a second end coupled to said body-mounted hinge component of said first door hinge;
- said rotary drive mechanism further includes a first coupler interconnecting said first end of said drive shaft to said output member of said electric motor and geartrain assembly and a second coupler interconnecting said second end of said drive shaft to said body-mounted hinge component of said first door hinge; and
- wherein said first coupler includes a first universal joint and said second coupler includes a second universal joint.

7. The power door actuation system of claim 3 wherein said drive shaft of said rotary drive mechanism is a flexible drive shaft, said first end of said drive shaft is coupled to an output member of said electric motor and geartrain assembly and said second end of said drive shaft is coupled to a body-mounted hinge component of said first door hinge.

8. The power door actuation system of claim 3 wherein said rotary drive mechanism permits change in relative orientation between said pivot axis and said power-operated actuator mechanism.

9. The power door actuation system of claim 3 wherein said rotary drive mechanism includes a multi-piece drive shaft assembly having a first end shaft coupled to an output member of said electric motor and geartrain assembly, a second end shaft coupled to a body-mounted hinge component of said first door hinge, and an intermediate shaft coupled to said first end shaft by a first U-joint and coupled to said second end shaft by a second U-joint.

10. The power door actuation system of claim 2 wherein said first door hinge is a lower door hinge and said second door hinge is an upper door hinge, wherein each of said upper and lower door hinges includes a body hinge strap adapted to be secured to the vehicle body, a door hinge strap adapted to be secured to the passenger door, and a hinge pin interconnecting said door hinge strap to said body hinge strap for pivotal movement, and wherein said power-operated actuator mechanism is secured adjacent to said door hinge strap of said upper door hinge and said rotary drive mechanism is adapted to be secured to said body hinge strap of said lower door hinge.

11. The power door actuation system of claim 1 further comprising an electronic control system for controlling actuation of said power-operated actuator mechanism so as to control rotation of said rotary drive mechanism and location of the passenger door between the open and closed positions relative to the vehicle body.

12. A power door actuation system for moving a passenger door of a motor vehicle between open and closed positions relative to a vehicle body, the power door actuation system comprising:
- a first door hinge having a first door hinge strap secured to the passenger door, a first body hinge strap secured to the vehicle body, and a first pivot pin pivotably connecting said first door hinge strap to said first body hinge strap;
- a second door hinge having a second door hinge strap secured to the passenger door, a second body hinge strap secured to the vehicle body, and a second pivot pin pivotably connecting said second door hinge strap to said second body hinge strap;
- said first door hinge defining a pivot axis about which the passenger door pivotably swings relative to the vehicle body;
- a power-operated actuator mechanism secured within a cavity of the passenger door adjacent to said first door hinge strap of said first door hinge and having a rotary output component;
- a rotary drive mechanism including a drive shaft extending from a first portion coupled to said rotary output component of said power-operated actuator mechanism to a second portion coupled to said second body hinge strap said second door hinge and an adapter attached to said second door hinge, wherein the adapter and said second door hinge are co-axial, said drive shaft transferring a rotational force generated by said power-operated actuator mechanism from said rotary output component to said second door hinge strap for causing pivotable movement of the passenger door relative to the vehicle body; and
- said rotary drive mechanism accommodating angular movement of said passenger door relative to said vehicle body.

13. The power door actuation system of claim 12 further comprising a control system operable for controlling actuation of said power-operated actuator mechanism so as to control direction and amount of rotation of said rotary output component for controlling position of the passenger door between the open and closed positions relative to the vehicle body.

14. The power door actuation system of claim 12 wherein said a first portion of said drive shaft has a first end coupled to said rotary output component and said second portion has a second end coupled to said second body hinge strap of said second door hinge.

15. The power door actuation system of claim 14 wherein said rotary drive mechanism further includes a first coupler interconnecting said first end of said drive shaft to said rotary output component and a second coupler interconnecting said second end of said drive shaft to said second body hinge strap of said second door hinge.

16. A power door actuation system for moving a passenger door of a motor vehicle between open and closed positions relative to a vehicle body, the power door actuation system comprising:
- a first door hinge having a first door hinge strap secured to the passenger door, a first body hinge strap secured to the vehicle body, and a first pivot pin pivotably connecting said first door hinge strap to said first body hinge strap;
- a second door hinge having a second door hinge strap secured to the passenger door, a second body hinge strap secured to the vehicle body, and a second pivot pin pivotably connecting said second door hinge strap to said second body hinge strap;

a power-operated actuator mechanism secured within a cavity of the passenger door adjacent to said first door hinge strap of said first door hinge and having a rotary output component;

a rotary drive mechanism having a first portion coupled to said rotary output component of said power-operated actuator mechanism by a first coupler and a second portion coupled to said second body hinge strap of said second door hinge by a second coupler, said rotary drive mechanism operable for transferring a rotational force generated by said power-operated actuator mechanism from said rotary output component to said second door hinge strap for causing pivotable movement of the passenger door relative to the vehicle body; and wherein said first coupler includes a first universal joint and said second coupler includes a second universal joint.

17. The power door actuation system of claim 12 wherein said drive shaft is a flexible drive shaft coupled to said rotary output component and to said second body hinge strap.

18. The power door actuation system of claim 12 wherein said rotary drive mechanism permits change in relative orientation between said pivot axis and said power-operated actuator mechanism.

19. The power door actuation system of claim 12 wherein said rotary drive mechanism includes a multi-piece drive shaft assembly having a first end shaft coupled to said rotary output component and a second end shaft coupled to said second body hinge strap, and an intermediate shaft coupled to said first end shaft by a first U-joint and coupled to said second end shaft by a second U-joint.

20. The power door actuation system of claim 12 wherein said power-operated actuator mechanism is an electric motor and gear reduction assembly.

21. The power door actuation system of claim 12 wherein said first door hinge is an upper door hinge and said second door hinge is a lower door hinge.

22. The power door actuation system of claim 14 for swinging the passenger door between the open and closed positions relative to the vehicle body and holding the passenger door in any intermediate position therebetween.

23. The power door actuation system of claim 1 wherein said first end of said drive shaft is coupled to said power-operated actuator mechanism by a first joint and said second end is coupled to said first door hinge by a second joint, and said joints accommodate angular movement of said passenger door relative to said vehicle body.

24. The power door actuation system of claim 12 wherein said first portion is coupled to said rotary output component of said power-operated actuator mechanism by a first joint, said second portion is coupled to said second body hinge strap of said second door hinge by a second joint, and said joints accommodate angular movement of said passenger door relative to said vehicle body.

* * * * *